Patented Aug. 23, 1932

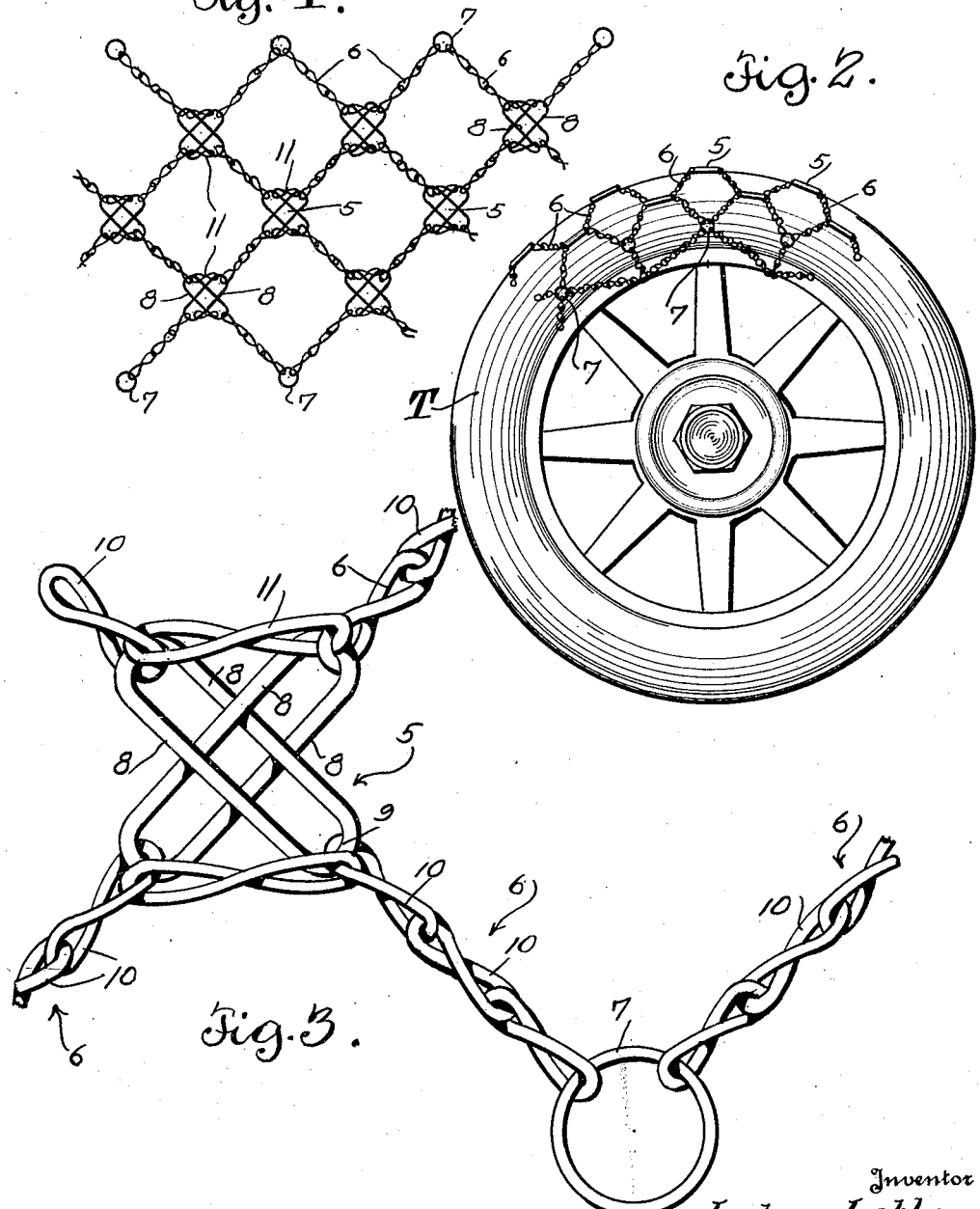

1,872,757

UNITED STATES PATENT OFFICE

LUDGER LABBÉ, OF CHICOPEE FALLS, MASSACHUSETTS

NONSKID TIRE CHAIN

Application filed October 17, 1931. Serial No. 569,509.

This invention relates to certain new and useful improvements in non-skid tire chains.

The primary object of the invention is to provide a non-skid tire chain comprised of a plurality of chain links assembled in a manner to provide anti-skid members to be positioned on the tread surface of a tire with the links of the anti-skid sections so related as to prevent movement of the links thereof in one direction whereby the links of the anti-skid members are maintained in position upon the tread of the tire.

A further object of the invention is to provide a non-skid tire chain wherein the non-skid members of the chain are formed of a pair of crossed links connected to 8-shaped links with a link connection between the 8-shaped links at opposite sides of the anti-skid members to prevent spreading thereof in one direction.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a diagrammatic plan view of a portion of a non-skid tire chain constructed in accordance with the present invention, showing the crossed links of the non-skid members connected by chains formed of 8-shaped links;

Figure 2 is a side elevational view of a vehicle wheel and tire with a portion of the non-skid chain mounted thereon; and Figure 3 is an enlarged fragmentary plan view showing one of the non-skid members and the associated chains formed of 8-shaped links.

Referring more in detail to the accompanying drawing and particularly to Figures 1 and 2, the reference character T designates the vehicle tire upon which the non-skid chain is adapted to be placed, the chain as illustrated in Figure 1, comprising a plurality of non-skidding elements 5, each formed of a pair of crossed links with a chain connection 6 between the ends of adjacent links forming a rectangular chain structure as illustrated, the opposite sides of the chain carrying rings 7 mating at opposite sides of the vehicle wheel to be connected together by a chain member or other fastening device for retaining the non-skid chain in position on the tire.

One of the anti-skidding elements 5 is illustrated in detail in Figure 3 and comprises a pair of closed links, each including parallel side legs 8 with their opposite ends connected by closed loops 9, the two closed links being inter-connected by having the leg of one link extended between the legs of the associated links. The connecting chains 6 between the non-skidding elements 5 are formed of 8-shaped links 10, the outer link of each side chain 6 being connected to a ring 7. The inner ends of the 8-shaped links 10 that are attached to the closed links 8 are connected by an 8-shaped link 11 which acts to prevent spreading of the outer ends of the links of the non-skidding elements circumferentially of the tire to retain the links 8 in crossed form. The non-skid members are included in the connecting chains in laterally spaced circumferential series with the non-skid elements of adjacent series in staggered relation for accomplishing more effective results in the prevention of skidding of the vehicle wheel or tire, the crossed links 18 so disposed as to prevent skidding in forward and lateral directions.

From the above detailed description of the invention, it is believed that the construction and use thereof will at once be apparent and while there is herein shown and described the preferred embodiment of the invention, it is nevertheless to be understood that minor changes may be made therein without departing from the spirit and scope of the invention as claimed.

I claim:—

1. A non-skid tire chain comprising non-skid elements and connecting chains therefor, each element formed of crossed interfitting closed links with the connecting chains attached to the ends of the links, and means to prevent separation of the ends of the links to which the connecting chains are attached, including links connecting the ends of the chains at their points of attachment to the crossed links.

2. A non-skid tire chain comprising non-skid elements and connecting chains therefor, each element formed of crossed interfitting closed links with the connecting chains attached to the ends of the links, and means to prevent separation of the ends of the links to which the connecting chains are attached, including links connecting the ends of the chains at their points of attachment to the crossed links, each crossed link having parallel side legs and loop ends and the connecting chains having links of 8-shape.

In testimony whereof I affix my signature.

LUDGER LABBÉ.